(12) United States Patent
Tyurin et al.

(10) Patent No.: US 8,688,644 B1
(45) Date of Patent: *Apr. 1, 2014

(54) SYSTEMS AND METHODS FOR PERFORMING RECOVERY OF DIRECTORY DATA

(75) Inventors: Vladimir Tyurin, Moscow (RU); Maxim Koval-Navrocky, Moscow (RU); Shawn Barker, Ottawa (CA)

(73) Assignee: Dell Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,031

(22) Filed: Jun. 27, 2012

Related U.S. Application Data

(63) Continuation of application No. 11/951,008, filed on Dec. 5, 2007, now Pat. No. 8,234,253.

(60) Provisional application No. 60/873,621, filed on Dec. 6, 2006.

(51) Int. Cl.
*G06F 17/00* (2006.01)
(52) U.S. Cl.
USPC ............ 707/675; 707/678; 707/685; 707/686
(58) Field of Classification Search
None
See application file for complete search history.

(56) References Cited

U.S. PATENT DOCUMENTS

| | | | |
|---|---|---|---|
| 6,785,786 B1 * | 8/2004 | Gold et al. ..................... | 711/162 |
| 6,804,689 B1 | 10/2004 | Havrda et al. | |
| 7,251,749 B1 * | 7/2007 | Fong et al. ...................... | 714/20 |
| 2005/0138461 A1 | 6/2005 | Allen et al. | |
| 2007/0143366 A1 | 6/2007 | D'Souza et al. | |
| 2007/0260492 A1 * | 11/2007 | Feied et al. ....................... | 705/3 |
| 2008/0005509 A1 | 1/2008 | Smith et al. | |

OTHER PUBLICATIONS

Microsoft Corporation, "Microsoft Windows 2003: Planning for Active Directory Forest Recovery," Oct. 2006, 45 pages.*
Enterprise Management Association, "Quest Recovery Manager for Active Directory Forest Edition," May 2007, 2 pages.
Gary Olsen; "Active Directory Administration Tips: Solving Active Directory Replication Failure," Oct. 2, 2007, 4 pages.

* cited by examiner

*Primary Examiner* — Mohammad S Rostami
(74) *Attorney, Agent, or Firm* — Winstead PC

(57) ABSTRACT

Systems and methods are disclosed for recovering data following a directory service malfunction, such as a forest-wide disaster in Microsoft® Active Directory. In certain examples, a single management console can be used for remotely recovering selected domain controllers in the forest without necessitating direct operator intervention. Multiple domain controllers can be concurrently restored from one or more backup files. Configurations of the system can advantageously eliminate manual intervention with each domain controller, thereby saving significant amounts of recovery time and effort. Also, certain systems and methods can be used to automatically and remotely quarantine corrupt domain controllers so that those individual domain controllers do not replicate with the newly restored environment, while allowing the domain controllers to remain online and in communication with the attached network. Certain disclosed methods further modify recovery procedures based at least in part on the type, and availability of, one or more DNS servers.

25 Claims, 9 Drawing Sheets

SYSTEMS AND METHODS FOR PERFORMING RECOVERY OF DIRECTORY DATA

RELATED APPLICATIONS

This application is a continuation of U.S. patent application Ser. No. 11/951,008, now U.S. Pat. No. 8,234,253, filed on Dec. 5, 2007. U.S. patent application Ser. No. 11/951,008 claims priority from U.S. Provisional Patent Application No. 60/873,621, filed on Dec. 6, 2006. U.S. patent application Ser. No. 11/951,008 and U.S. Provisional Patent Application No. 60/873,621 are hereby incorporated herein by reference in their entirety.

BACKGROUND OF THE INVENTION

1. Field of the Invention

Embodiments of the invention relate to disaster recovery of directory services and, in particular, to systems and methods for providing a full forest recovery of an Active Directory® forest.

2. Description of the Related Art

With today's increasing reliance on technology, it is crucial for a modern business to maintain the availability of its network computer environment. Unplanned downtime caused by a disastrous event can severely disrupt the operation of, and be extremely costly to, a business. Such is especially true when dealing with disasters relating to directory services that manage information regarding various network resources and settings across a domain.

Disaster recovery, which remains a major challenge in the software industry, can address a wide variety of directory service malfunctions. For instance, disasters related to Microsoft's Active Directory® (AD), a distributed directory service system, can be grouped into three general categories: physical disasters, granular disasters and corruption of the entire AD database.

Physical disasters generally involve the physical failure of one or more domain controllers in the AD system. Most of the AD service, however, remains operational. Granular disasters occur when some data within an AD database is deleted or inadvertently modified. Such granular disasters can occur frequently and be caused by, for example, human error (e.g., an administrator accidentally deleting a number of user objects), malicious activity, viruses and/or software failures. Granular disasters can often be remedied in a matter of minutes after the problem has been detected, thereby limiting business losses.

On the other hand, there is the possibility for a much greater logical disaster (or corruption) that can result in the entire AD forest becoming non-functional. Such forest-wide disasters necessitate recovery of the entire AD forest and often result in considerable user and system downtime and potentially very high business losses.

For example, one current solution to forest-wide disaster recovery in AD involves a manual, time-intensive process that requires restoration of a single domain controller from backup. The solution further involves physical isolation of each domain controller from others in the forest in order to rebuild the corrected forest environment one stage at a time. Such isolation, however, can present a considerable problem because it involves physical access to each domain controller, which is not always possible. This solution also requires numerous manual steps repeated on each domain controller in the forest and results in a relatively slow and tedious recovery, which is prone to human error. Moreover, the physical isolation of domain controllers results in the domain controllers being offline (e.g., disconnected from the network) during the recovery process.

SUMMARY OF THE INVENTION

Given the aforementioned issues and challenges, a significant need exists for devising and implementing systems and methods for facilitating the recovery of an entire AD forest following a forest-wide disaster. For example, a need exists for intelligent systems and methods for restoring an AD forest such that automation of forest recovery tasks can be executed from a single user-friendly control console.

In view of the foregoing, certain embodiments of the invention provide for systems and methods for recovering directory data while maintaining each of the domain controllers online and in communication with a central control system. For example, recovery methods and systems disclosed herein are capable of electronically isolating domain controllers in a forest to prevent unwanted replication without disconnecting the domain controllers from the network, such as when a domain controller is operating in the Directory Services Restore Mode (DSRM). Such embodiments advantageously allow for the restoration of an AD forest from a centralized location, thereby eliminating or substantially reducing the need to manually interface with each domain controller separately.

In certain embodiments of the invention, a forest recovery software program utilizes a process that orchestrates the restoration procedures on all the domain controllers. Depending on the AD forest configuration, the sequence of restoring the domain controllers can vary. Also the Domain Naming Services (DNS) configuration of the forest can influence the program execution flow. For example, before performing certain parts of the recovery process, it can be advantageous to wait until the domain controllers serving as DNS servers are fully restored.

In certain embodiments, a computer-executable method is disclosed for performing disaster recovery of directory data. The method comprises identifying computing devices associated with a first domain and communicatively coupled together through a network, each of the computing devices storing a copy of a directory database. The method further includes receiving a selection of one of the computing devices to be recovered; restoring a backup copy of the directory database to the selected computing device; and remotely disabling replication to the restored directory database on the selected computing device without disconnecting the selected computing device from the network. The method also comprises recovering the remaining computing devices by restoring backup copies of the directory database to each of the remaining computing devices and re-enabling replication to the restored directory database on the selected computing device.

In certain embodiments, a system is disclosed for recovering data following a directory service malfunction. The system comprises recovery agent modules, a recovery manager and a management console. Each recovery agent module is installed on a respective domain controller of a plurality of domain controllers communicatively coupled through a network in a first domain. The recovery manager module is installed on an application server and is in communication with each of the recovery agent modules, the recovery manager module being located remotely with respect to at least one of the plurality of domain controllers. The management console is in communication with the recovery manager module and is configured to receive a selection of one of the plurality of domain controllers to be recovered. Furthermore, the recovery manager module is configured to issue one or more control signals to the recovery agent module of the selected domain controller to: restore a backup copy of a directory database to the selected domain controller and disable replication to the restored directory database on the selected domain controller without removing the selected domain controller from communication with the network.

In certain embodiments, a system is disclosed for performing disaster recovery of directory data. The system comprises: means for identifying computing devices associated with a first domain and communicatively coupled through a network, each of the computing devices storing a copy of a directory database; means for receiving a selection of one of the computing devices to be recovered; means for restoring a backup copy of the directory database to the selected computing device; means for remotely disabling replication to the restored directory database on the selected computing device without disconnecting the selected computing device from the network; means for recovering the remaining computing devices by restoring backup copies of the directory database to each of the remaining computing devices; and means for re-enabling replication to the restored directory database on the selected computing device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 7-9 illustrate exemplary embodiments of screen displays of a forest recovery report usable with the management console of FIG. 1.

DETAILED DESCRIPTION OF THE PREFERRED EMBODIMENTS

Figure 1:
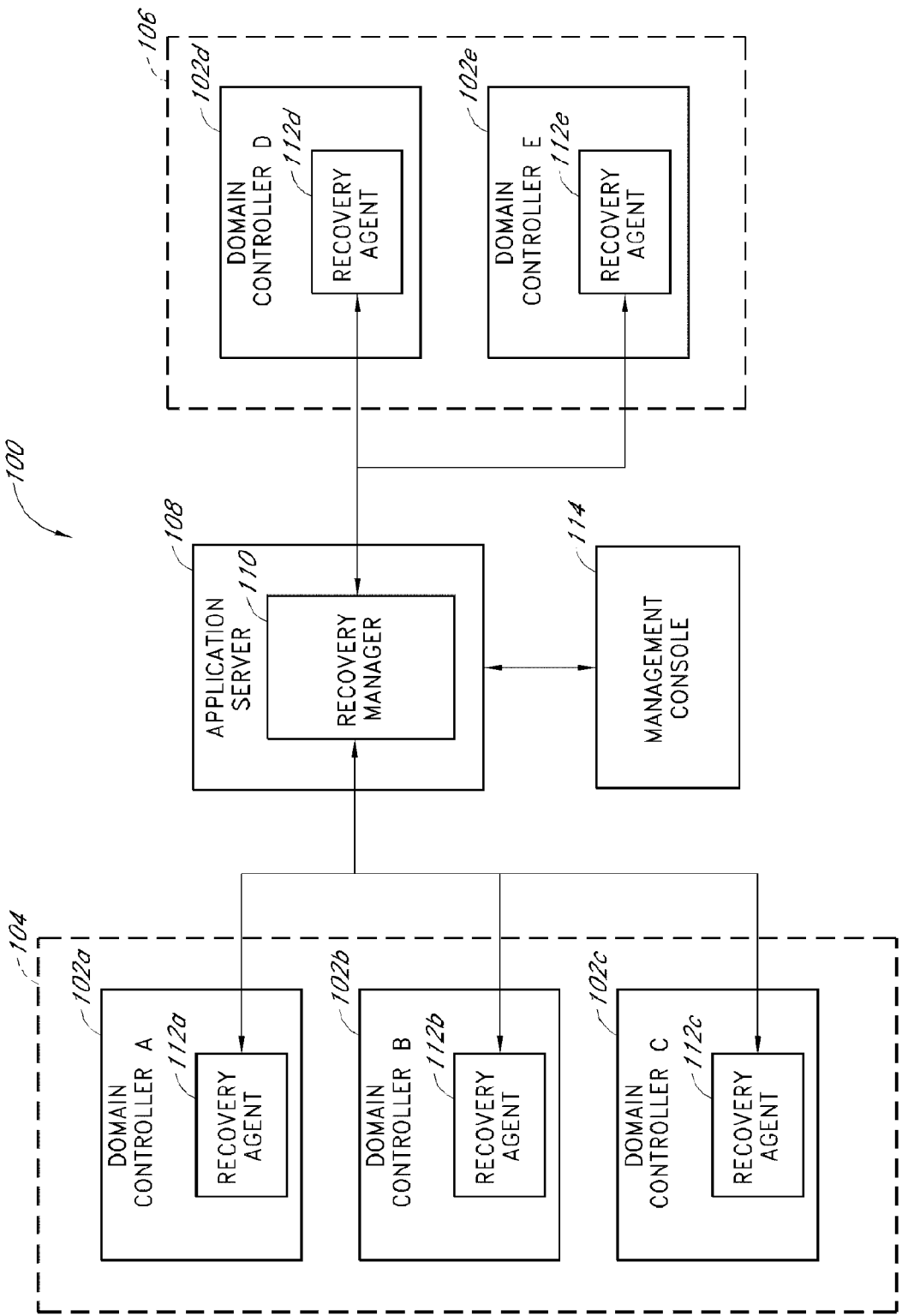
FIG. 1 illustrates an exemplary block diagram of a system for recovering an AD forest following a disaster, according to certain embodiments of the invention.

Embodiments of the invention disclosed herein are designed to address shortcomings of existing disaster recovery systems. In particular, certain disclosed inventive systems and methods allow for the remote management and/or automation of disaster recovery tasks in a Microsoft® AD forest. Moreover, certain embodiments provide for a single console for managing the recovery effort, which enables a user to conduct domain controller selection, progress tracking and/or remote, concurrent restoration of multiple domain controllers in a forest.

AD domain controllers each contain a replica of database data. One characteristic of AD is that, generally, each domain controller contains a writable copy of the database. This configuration introduces a need for replication to ensure that data is consistent between all domain controllers. Replication, however, can be a significant problem while trying to recover from a forest-wide AD disaster. Because the disaster is forest-wide, it is possible that corrupted data has already spread across multiple, or all, domain controllers. This, in turn, leads to a potential problem that newly restored domain controllers can receive corrupted data again via the replication process.

Thus, disasters in an AD forest can result in considerable user and system downtime and potentially very high business losses. Some examples of forest-wide failures include:

Domain controllers in the forest are not able to replicate with their replication partner(s);

Changes cannot be made to AD at any domain controller;

New domain controllers cannot be installed;

Some or all domain controllers in the forest have been logically corrupted or physically damaged; and/or Intentional or accidental compromising of the AD environment (e.g., execution of a script that spreads data corruption across the forest or extension of AD schema with malicious or conflicting changes).

In certain embodiments of the invention, systems and methods are disclosed for restoring and recovering a Microsoft® AD forest after a disaster. Certain embodiments of the invention also provide for automation of disaster recovery tasks in an AD environment. For example, a single management console can be used for remotely recovering select or all domain controllers in the forest without necessitating direct operator intervention. Such a design allows for multiple domain controllers in a forest to be restored concurrently or substantially concurrently from a centralized location, from one or more backup files. Such embodiments can advantageously eliminate the need to manually interface with each domain controller separately, saving a significant amount of time and effort. Also, such automation can expedite the overall recovery process, reduce potential for human error and/or substantially reduce user interaction with complex command line utilities.

In addition, certain embodiments of the invention advantageously provide for backup selection capabilities to ensure that a consistent, unaffected set of backups is chosen for all domains. Also, embodiments of the invention provide assurance that affected copies of AD are properly quarantined such that corruption cannot propagate to a newly restored environment. That is, in certain embodiments, disclosed systems and methods can be used to automatically and remotely quarantine corrupt domain controllers so that those individual domain controllers do not replicate with the newly restored environment, which allows the domain controllers to remain online.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

FIG. 1 illustrates a block diagram of a system 100 for recovering directory services following a disaster, according to certain embodiments of the invention. For exemplary purposes, the recovery system 100 of FIG. 1 will be described with reference to a Microsoft® AD environment. It will be understood, however, that the inventive aspects of the recovery system 100 can be used in a variety of other directory services environments, such as for example, IBM Tivoli® Directory Server, Sun Java® System Directory Server, Novell® eDirectory, or the like.

The main physical component of AD is the domain controller, which is a computing device where the AD database resides. Because AD is a distributed directory service, there are typically multiple domain controllers that contain a copy of the AD database. One or more domain controllers can be grouped together in a domain, which represents a logical collection of objects such as user accounts, groups, computers and other resources. An AD forest represents a collection of one or more domains.

The illustrated recovery system 100 comprises a plurality of computing devices communicatively coupled through a network. In particular, the recovery system 100 includes a forest having a plurality of domain controllers 102a, 102b, 102c, 102d and 102e for maintaining and executing a directory service. As shown, domain controllers 102a, 102b and 102c are part of a first domain 104 in the forest, while domain controllers 102d and 102e make up a second domain 106. Although not specifically depicted in FIG. 1, one or more of the domain controllers 102a-102e in the forest can be configured to communicate with any of the other domain controllers 102a-102e in the forest.

The recovery system 100 also comprises an application server 108, which includes a recovery manager 110. In certain embodiments, the recovery manager 110 is configured to coordinate and/or control recovery of the forest of domain controllers 102a-102e in response to a forest-wide disaster. For instance, the recovery manager 110 can execute one or more methods disclosed herein to perform remote and/or centralized recovery of multiple domain controllers.

As shown, the recovery manager 110 communicates with recovery agents 112a, 112b, 112c, 112d and 112e installed on the respective domain controllers 102a-102e. The recovery agents 112a-112e, in certain embodiments, comprise software modules programmed to recover a particular domain controller. For instance, the recovery agents 112a-112e can be configured to locate one or more backups associated with the corresponding domain controller. In yet other embodiments, the recovery agents 112a-112e, and/or separate backup agents, can also direct the backup of the appropriate domain controller during normal operation and/or record appropriate information on such backups (e.g., time and/or location of backup). In certain embodiments, the recovery agents 112a-112e must be installed on the respective domain controllers prior to a disaster in order for the recovery system 100 to recover the particular domain controllers.

The recovery system 100 also includes a management console 114, which provides a user interface for directing a disaster recovery process and/or for observing the progress or state of the system 100 during recovery. In certain embodiments, the user interface contains a list of domain controllers and associated settings, such as, for example, the credentials that the recovery manager 110 uses to access the domain controllers, pertinent backups, the status of recovery, combinations of the same or the like. In certain embodiments, the management console comprises 114 a workstation, a server, a personal computer, a software application, combinations of the same or the like.

Although the management console 114 is illustrated as being separate from the application server 108, it will be understood that the management console 114 can be integrated with the recovery manager 110 and/or the application server 108. For example, the management console 114 can comprise a snap-in module of the application server 108.

Figure 2:
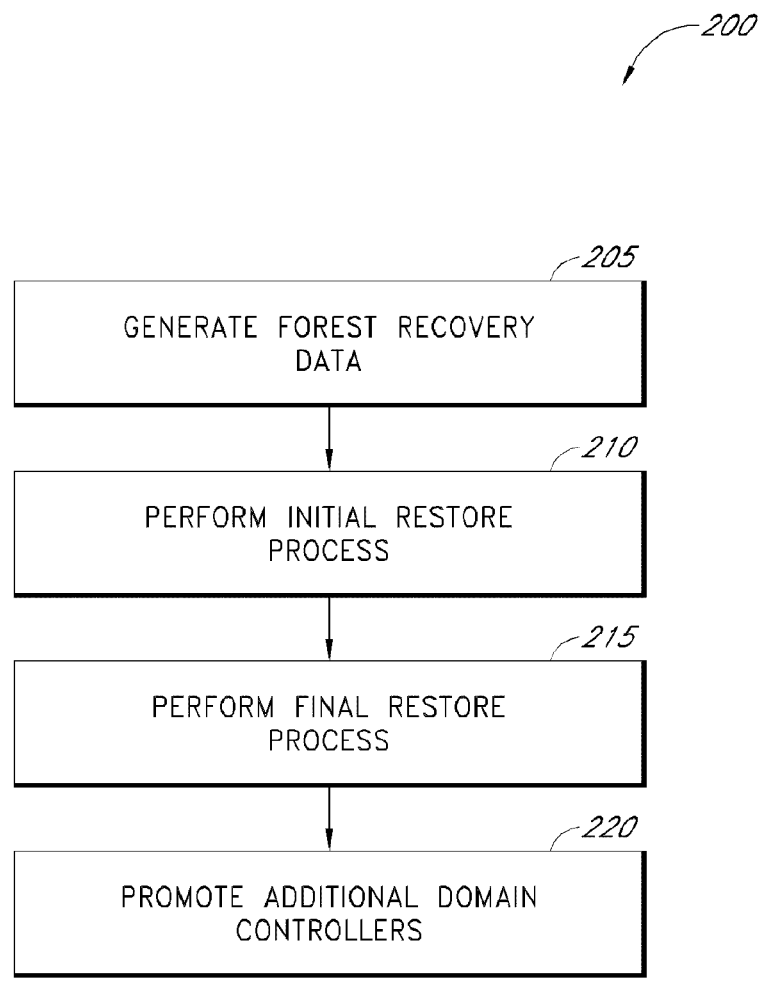
FIG. 2 illustrates a flowchart of an exemplary embodiment of a recovery method usable by the recovery system of FIG. 1.

FIG. 2 illustrates a flowchart of an exemplary embodiment of a method 200 for orchestrating restoration and recovery operations following a disaster in a directory environment. For instance, the recovery method 200 can be used in an AD forest in the event that a forest-wide failure renders most or all the domain controllers in the forest incapable of functioning normally and/or if there is a risk that corrupted domain controllers may spread harmful data to new domain controllers. For exemplary purposes, the recovery method 200 will be described with reference to the recovery system 100 components illustrated in FIG. 1.

The recovery method 200 begins with Block 205 by generating initial forest recovery data. In certain embodiments, such a process includes preparing a list of the domain controllers to be restored. The process can also include generating a series of passwords, such as, for example: (1) the krbtgt account password (i.e., an account and password that form part of the Kerberos authentication process implemented in AD to allow domain controllers to securely authenticate, communicate and/or replicate data with each other), (2) the computer account password and/or (3) the trust password (i.e., the password that allows one AD domain to share information and resources with another AD domain).

In certain embodiments, generating the recovery data includes creating a topology map of the AD forest. Such a map can specify pertinent details about domain controllers in the forest, such as, for example, the domain controller names, Flexible Single Master Operation (FSMO) roles and backup status, trust relationships, combinations of the same and the like.

Following Block 205, the recovery method 200 performs an initial restore process (Block 210). In certain embodiments, the initial restore process is substantially the same for all domain controllers in a forest and generally comprises restoring the AD database from backup. For example, in certain embodiments, the initial restore process for multiple domain controllers can advantageously be performed in parallel to expedite recovery speed. Moreover, multiple domain controllers can each be restored from different backups taken at similar points in time, followed by a reconciliation of the databases. In other embodiments, multiple domain controllers can be restored from the same backup or copies thereof. Additional details with respect to the initial restore process are described herein with reference to FIG. 3.

Next, at Block 215, the recovery method 200 performs a final restore process. The final restore process generally involves one or more actions that may or may not require that certain domain controllers already be restored. For instance, the final restore process ensures that restored domain controllers do not replicate with corrupt domain controllers when replication is enabled between domain controllers. Moreover, the final restore process can include performance of tasks following the loading of an AD database backup onto the domain controller. Additional details with respect to the initial restore process are described herein with reference to FIG. 4.

Finally, the recovery process 200 promotes additional domain controllers (Block 220). Promotion of additional domain controllers, in certain embodiments, involves two main steps. First, the recovery process 200 identifies one or more domain controllers that were not or could not be restored from backup and uninstalls AD from those domain controllers (i.e., demotion of the domain controller). The second step involves reinstalling AD on the domain controllers. In other embodiments, Block 220 further includes promoting new domain controllers that were not originally part of the AD at the time of the disaster.

Although the recovery process 200 has been described with reference to particular embodiments, additional states or acts may be performed in other embodiments of the invention. For example, following the final restore process of a domain controller, one or more of the following tasks can be performed: (i) enabling the domain controller as a global catalog if the domain controller was a global catalog before the restoration procedure, and (ii) clean-up of directory metadata associated with domain controllers that were not restored during the forest recovery restoration procedure or for which restoration failed.

Figure 3:
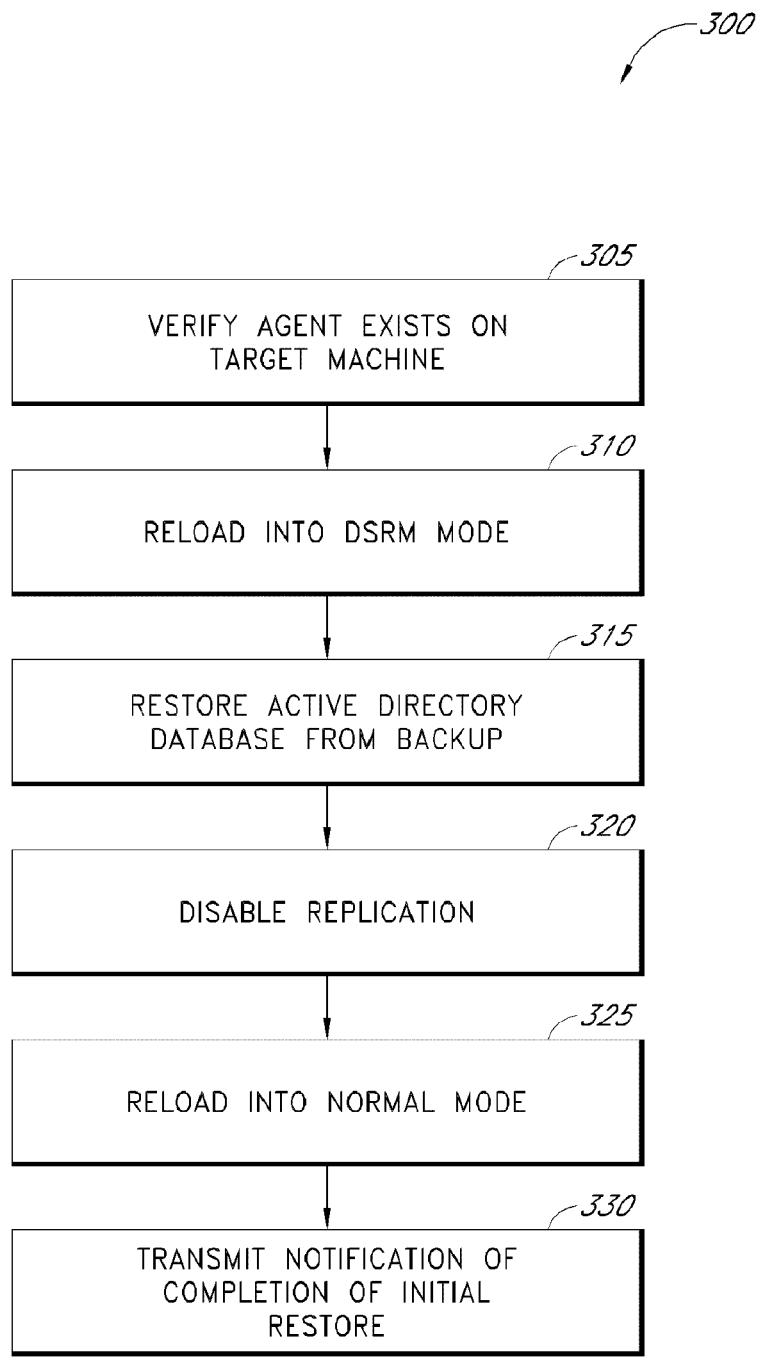
FIG. 3 illustrates a flowchart of an exemplary embodiment of an initial restore process of the recovery method of FIG. 2.

FIG. 3 illustrates a flowchart of additional details of an initial restore process 300 of the recovery method 200 of FIG. 2, according to certain embodiments of the invention. For instance, in certain embodiments, the initial restore process 300 can take place during Block 210 of FIG. 2. In general, the initial restore process 300 involves restoring the AD database from backup.

The initial restore process 300 begins with Block 305 by verifying that a recovery agent (e.g., one of recovery agents 112a-112e), exists on each target domain controller to be restored. At Block 310, the initial restore process 300 reloads the target domain controllers into the DSRM mode, which causes the AD database (Ntds.dit) to go offline.

At Block 315, the initial restore process 300 restores, for each domain controller, the AD database from a backup file. In order to obtain a "good" or "trusted" backup, in certain embodiments, a backup file is advantageously selected that was taken a certain amount of time (e.g., a few days) before the disaster. For instance, in selecting an appropriate backup, a balance may need to be made between the recentness of the backup and the reliability of the restored data. In many situations, restoring the domain controller can involve the loss of certain AD data, including, but not limited to, the following actions occurring after the time of the backup: addition of new objects, updates made to existing objects, or changes made to the configuration partition or the schema partition in AD.

At Block 320, the initial restore process 300 disables replication by the domain controllers such that communication between domain controllers is temporarily halted while the domain controllers remain online. In certain embodiments, commands for disabling replication are issued from a single location remote from the domain controllers. This is especially advantageous in an environment in which several (e.g., hundreds) of domain controllers in an AD forest are located across a large geographic area.

At Block 325, the target domain controllers are reloaded into normal mode. At the end of the process 300, a notification is transmitted (e.g., to the recovery manager 110) that indicates the completion of the initial restore process 300. For instance, in certain embodiments, the recovery agent 112a-112e for each domain controller 102a-102e notifies the recovery manager 110 when the respective domain controller has been restored.

Although the initial restore process 300 has been described with reference to particular embodiments, it will be apparent from the disclosure herein that alternative embodiments of the process 300 can be performed. For instance, in certain embodiments, the domain controller can be physically quarantined to prevent communication, such as by unplugging the domain controller's network cable or the like.

Figure 4:
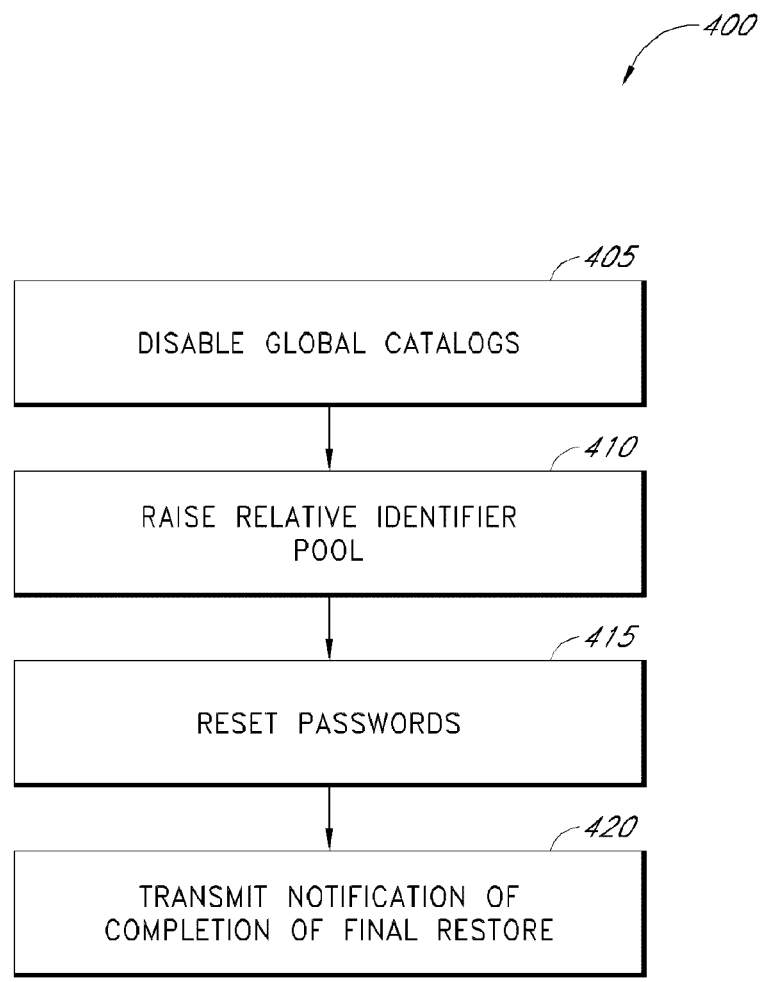
FIG. 4 illustrates a flowchart of an exemplary embodiment of a final restore process of the recovery method of FIG. 2.

FIG. 4 illustrates a flowchart of additional details of a final restore process 400 of the recovery method 200 of FIG. 2, according to certain embodiments of the invention. For instance, in certain embodiments, the final restore process 400 can take place during Block 215 of FIG. 2. In certain embodiments, the final restore process 400 is performed to ensure that newly restored domain controllers do not replicate with corrupt domain controllers when replication, which was disabled during Block 320 of the initial restore process 300, is re-enabled between the domain controllers.

The final restore process 400 begins with Block 405 by disabling the global catalogs in the AD forest. Although typical domain controllers contain information only on objects that exist in the same domain, certain domain controllers store a global catalog that serves as a special copy of the AD database that contains information on objects that exist in the multiple domains of the AD forest. Disabling the global catalog results in a domain controller losing partial replicas, or partitions, and/or prevents the occurrence of lingering objects. Also, when the global catalogs are disabled, the Administrator account is the only account that can be used to log on to a domain controller.

At Block 410, the final restore process 400 includes raising the relative identifier (RID) pool a particular amount. In general, the RID pool is retained on a domain controller responsible for assigning a unique identifier, or security identifier (e.g., a numeric value), for every object (e.g., user, group, computer) that is created in a particular domain. In order to avoid duplication of identifiers following recovery, such as may be caused when identifiers are issued to objects between the time of the latest backup and the time of the recovery, the current value of the RID pool is increased by a large number (e.g., by 100,000).

At Block 415, the final restore process 400 includes resetting passwords in order to further isolate the domain controllers from replication partners. For instance, in certain embodiments, Block 415 is performed prior to re-enabling replication (which was disabled in Block 320 of the initial restore process 300) so that only recovered domain controllers can communicate with one another in the new AD environment. Such passwords can include, for example, computer account passwords in AD, local computer account passwords, trusts passwords, krbtgt passwords, combinations of the same and the like. In certain embodiments, one or more of the passwords is reset twice so as to remove any original (pre-disaster) password from the password history.

After resetting the passwords, the final restore process 400 terminates at Block 420 by transmitting a notification that the process 400 is complete. For instance, in certain embodiments, the recovery agent 112a-112e for each domain controller 102a-102e notifies the recovery manager 110 when the final restore process is complete. This block can also include, for example, re-enabling replication between two or more domain controllers of the AD forest.

Although the initial restore process 300 of FIG. 3 and the final restore process 400 of FIG. 4 have been described as separate processes, in other embodiments, blocks or states described in these two process can be performed substantially concurrently, performed in a different order and/or optionally removed. For instance, in certain embodiments, the reloading of a domain controller into its "normal" mode (Block 325) can be performed during the final restore process 400 (e.g., following the resetting of passwords in Block 420).

Figure 5:
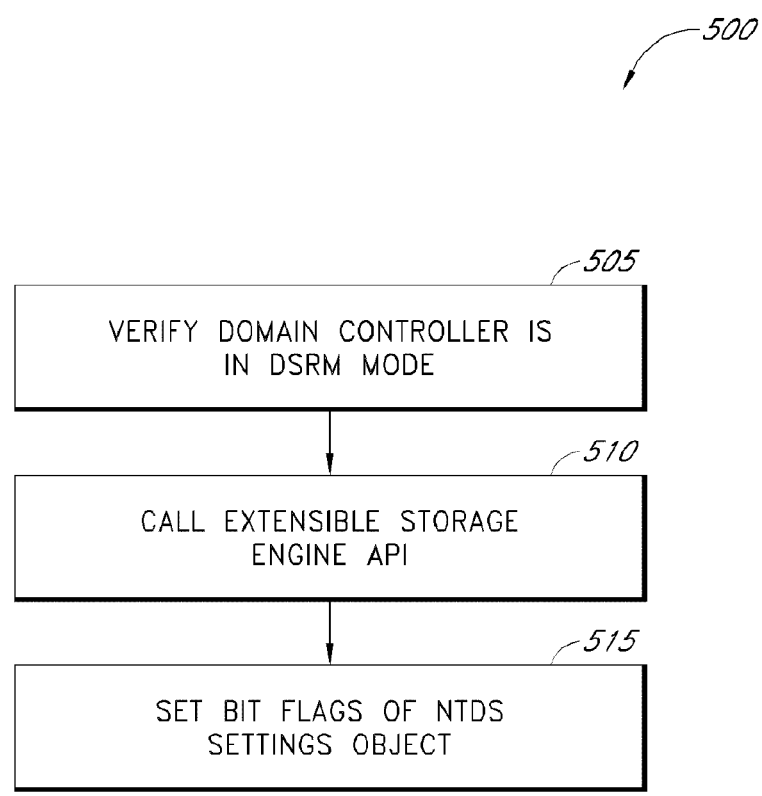
FIG. 5 illustrates a flowchart of an exemplary embodiment of a process for isolating a domain controller from replication during the initial restore process of FIG. 3.

FIG. 5 illustrates a flowchart of a process 500 for isolating or quarantining a domain controller from replication, according to certain embodiments of the invention. For example, the isolation process 500 can be advantageously performed during the initial restore process of FIG. 3 (e.g., Block 320) in order to temporarily disable AD replication to and/or from the domain controller while the domain controller remains online.

Moreover, because the domain controller remains online and functioning, the isolation process 500 can be performed remotely rather than requiring an individual to manually and physically isolate the domain controller by disconnecting the domain controller from the network (e.g., by unplugging a network cable). Such an automated process helps alleviate concerns that can arise in the manual process (e.g., confidence that every domain controller in a forest has been physically turned off).

In addition, unlike conventional methods of disabling replication, the isolation process 500 presumes that AD is not actively running on the domain controller. As a result, the isolation process 500 can be advantageously used in a forest recovery scenario because the isolation process 500 can ensure directory data will not be replicated before the domain controller is restored to its desired state.

The isolation process 500 begins at Block 505 by verifying that the particular domain controller to be isolated is in the DSRM mode. This mode ensures that the AD database is not running on the particular domain controller. Once the domain controller is loaded in the DSRM mode and restored from backup, the isolation process proceeds to electronically quarantine the domain controller.

For example, the AD database resides in a physical file, ntds.dit, in an extensible storage engine (ESE) database. In order to disable AD replication when the AD service is not running, the isolation process 500 calls the ESE application programming interface (API) (Block 510). The ESE API is then used to set particular attributes of the NTDS Settings object to disable replication for the particular domain controller. In certain embodiments, the attributes of the NTDS Settings object include data representing how the domain controller is identified with respect to its replication partners, the naming contexts that are maintained on the domain controller, whether or not the domain controller is a global catalog server, and/or a default query policy.

In particular, the NTDS Settings object includes an "options" attribute, wherein bits [2] and [4] are flags for inbound and outbound replication. Thus, in certain embodiments, isolation of the domain controller is achieved via setting the bit flags in this options attribute, using the ESE API. In this manner, replication will not take place when the domain controller is rebooted into a normal operational mode (e.g., when AD is running).

Although the isolation process 500 has been described with reference to particular embodiments, other means and/or methods can be used to electronically disable replication while a domain controller remains online. For example, the isolation process 500 can configure a firewall module to filter out certain types of data and/or cut replication traffic to and/or from a domain controller. In other embodiments, the internet protocol security (IPsec) can be configured to limit and/or prevent communication between domain controllers in a domain or forest.

In yet other embodiments, the isolation process 500 can temporarily disable network adapters or utilize a customized driver to intercept replication traffic. In yet other embodiments, the isolation process 500 can temporarily remove replication links and disable the knowledge consistency checker (KCC) or other like module that generates and maintains the domain or forest replication topology.

Figure 6:
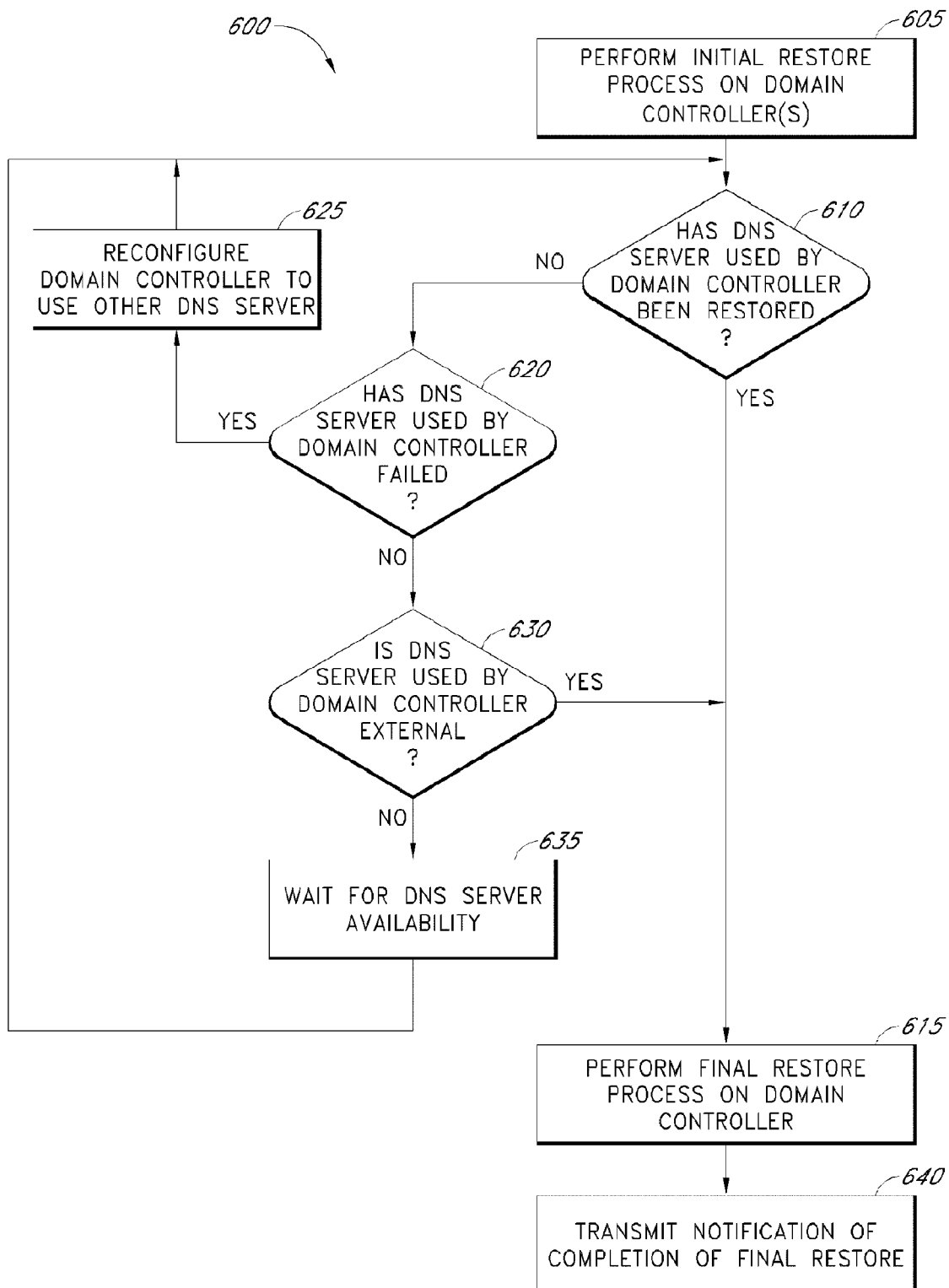
FIG. 6 illustrates a flowchart of an exemplary embodiment of a restoration process usable by the recovery system of FIG. 1.

FIG. 6 illustrates a flowchart of a process 600 for restoring multiple domain controllers at the same, or substantially the same time, according to certain embodiments of the invention. In particular, the restoration process 600 takes certain precautions for ensuring operational DNS availability during restoration of an entire forest. In certain embodiments, the restoration process 600 can be performed in connection with the recovery method 200 of FIG. 2, such as between or during the initial restore process (Block 210) and the final restore process (Block 215).

DNS availability, in certain circumstances, can be critical to AD functionality and communication between computing devices in AD. In certain embodiments, two types of DNS servers exist with respect to an AD forest: external and internal DNS servers. An external DNS server is supplied by a user and is not located on any forest domain controllers. An internal DNS server, on the other hand, is located on one of the forest domain controllers.

As illustrated, the restoration process 600 begins by performing an initial restore process on one or more domain controllers (Block 605). For instance, this block can include restoring backup files to one or more selected domain controllers. As discussed above, in certain embodiments, the initial restore process can comprise one or more acts described with reference to Block 215 of the recovery method 200 and/or the initial restore process 300 of FIG. 3.

At Block 610, prior to continuing with final restoration actions (see, e.g., the final restore process 400 of FIG. 4), the restoration process 600 determines if the DNS server used by the subject domain controller(s) has already been restored. For example, the restoration process 600 can check the IP address of each of the already restored domain controllers to determine if the IP address of the restored domain controller matches that of the appropriate DNS server.

If the appropriate DNS server has been restored, the restoration process 600 continues with the final restore process on the domain controller (Block 615). However, if the DNS server has not yet been restored, the restoration process 600 proceeds with Block 620 to determine if the DNS server used by the subject domain controller has failed. If the DNS server has failed, the restoration process 600 reconfigures the subject domain controller to use another DNS server (Block 625). After reconfiguring the domain controller, the restoration process 600 returns to Block 610 to determine if the other DNS server has been restored.

If at Block 620 the DNS server used by the subject domain controller has not failed, the restoration process 600 proceeds with Block 630 to determine if the DNS server is external to the forest. If the DNS server is external, the restoration process 600 proceeds with Block 615.

If the DNS controller is hosted internally, the restoration process 600 waits for availability of the internal DNS server (Block 635) and restoration of the DNS server (Block 610) before proceeding with the final restore process of the subject domain controller(s). Once the internal DNS server is restored, the restoration process 600 proceeds with Block 615.

Following Block 615, the restoration process 600 transmits a notification that the final restore process has been completed (Block 640). For instance, in certain embodiments, the recovery agent 112a-112e for each domain controller 102a-102e notifies the recovery manager 110 when the final restore process is complete.

In certain embodiments of the invention, the restoration process 600 and the isolation process 500 are performed substantially concurrently to recover an AD forest. For instance, during Blocks 610-635 the domain controller(s) can be electronically isolated to prevent replication (see FIG. 5). In particular, as discussed in more detail above, replication can be disabled through the NTDS Settings object during or following Block 605 and re-enabled during or following Block 615.

Figure 7:
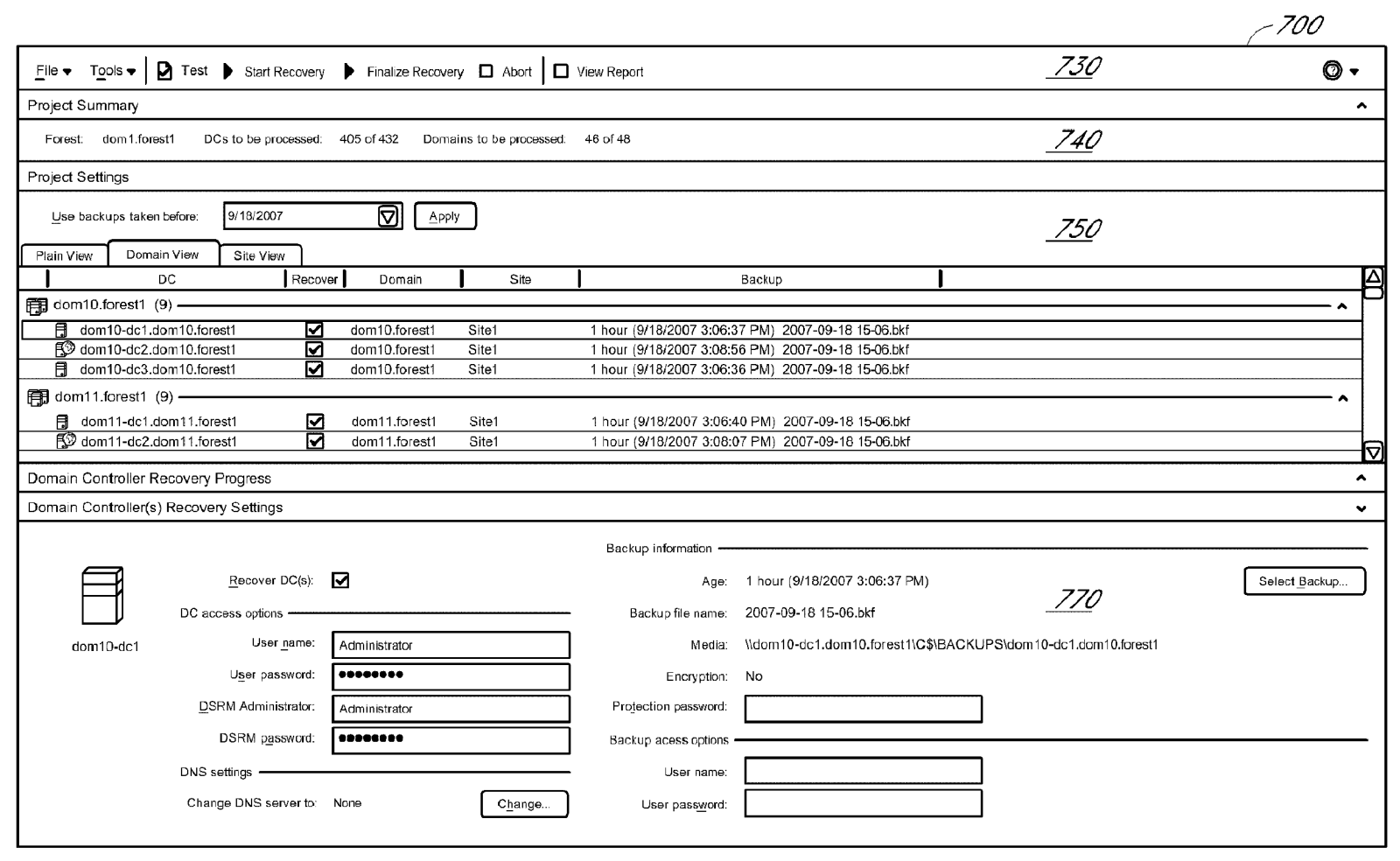
Figure 8:
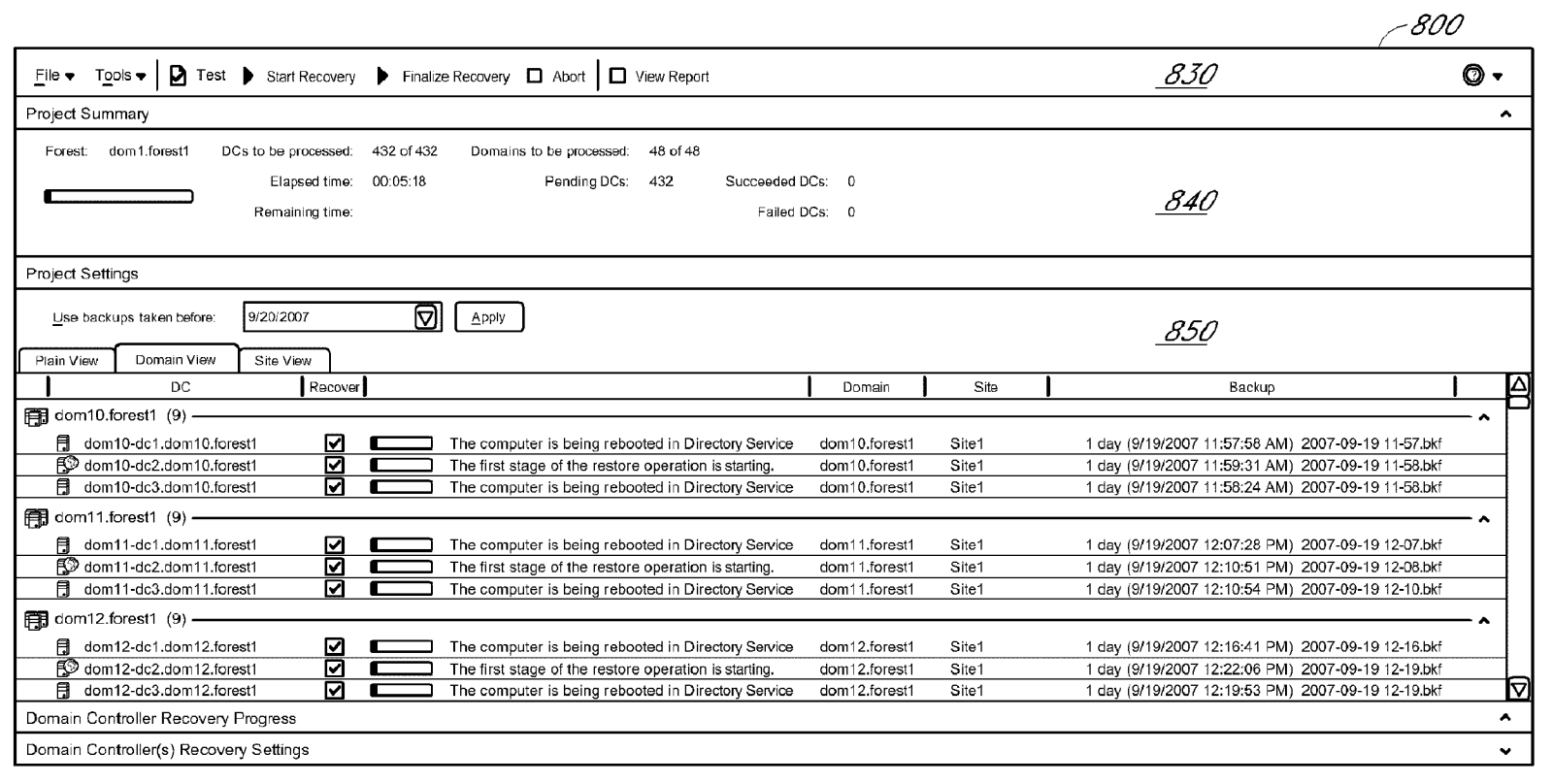
Figure 9:
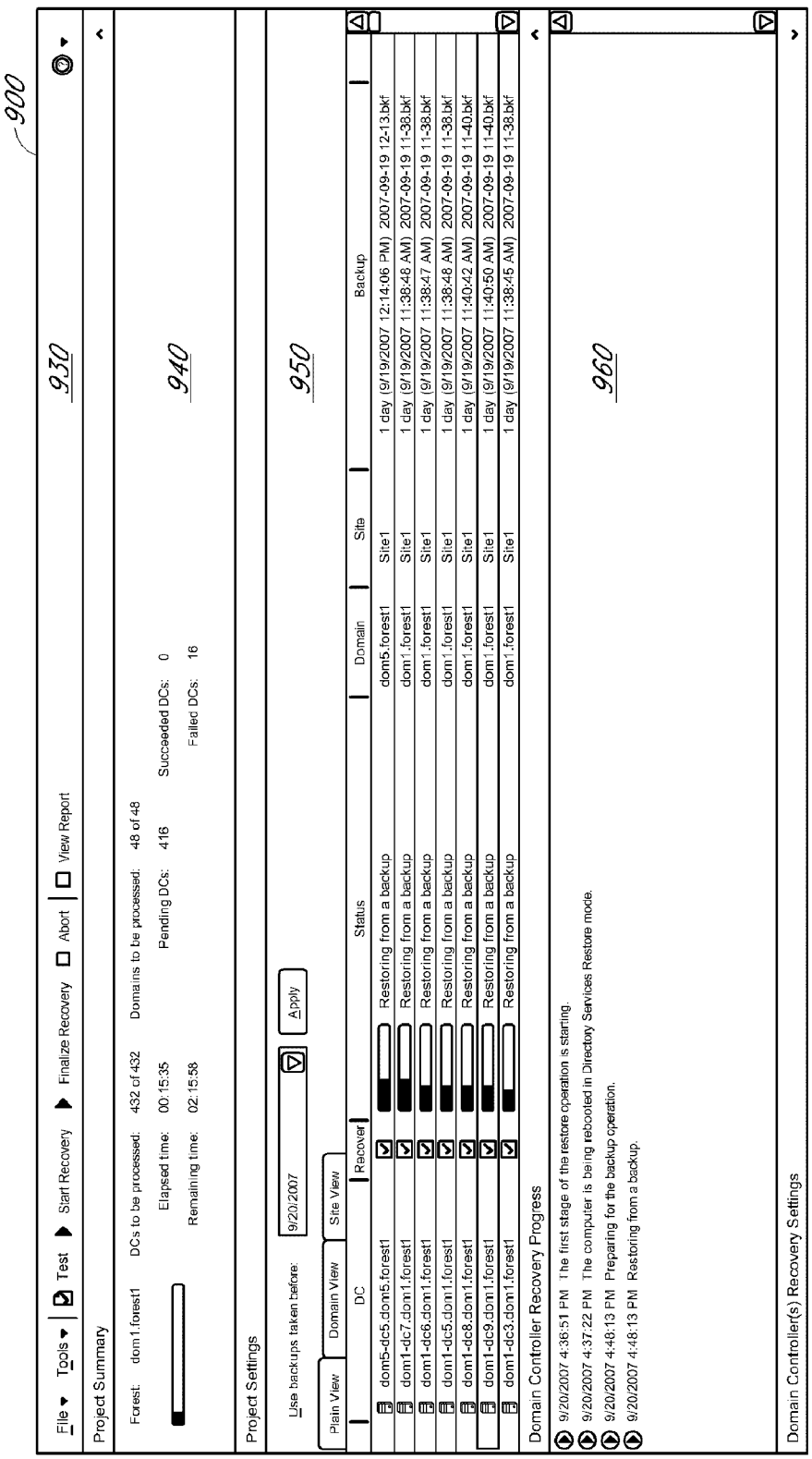

FIGS. 7-9 illustrate screen displays of a forest recovery report, according to certain embodiments of the invention. In certain embodiments, the screen displays are part of the user interface of the management console 114 of FIG. 1. For instance, through the screen displays, a user can advantageously coordinate the recovery of an AD forest, including controlling concurrent restoration of a plurality of domain controllers located at remote locations.

In particular, FIG. 7 illustrates a screen display of a new forest recovery report 700 having a plurality of sections. A command menu 730 allows a user to manage a plurality of aspects of a recovery project. For instance, the command menu 730 can provide a user with options to: open, save, finalize, abort or close a recovery project; execute a recovery project in a "test" mode; view a report on the current recovery or test operation; combinations of the same or the like.

A project summary section 740 summarizes information about the forest to be recovered. For example, the project summary section identifies the forest to be recovered (i.e., dom1.forest1) and the number of domains and/or domain controllers to be processed.

A project settings section 750 provides a list of domain controllers in the subject forest. The list can comprise information such as, for example, a domain controller DNS name, a recover command option, a name of the domain and/or site to which the domain controller belongs, date(s) and time(s) of backups, combinations of the same or the like. In certain embodiments, the project settings section 750 can include a plurality of views (e.g., plain view, domain view, site view) for organizing the domain controller information.

A recovery settings section 770 comprises an information pane for a domain controller selected from the project settings section 750. In particular, the recovery settings section 770 allows a user to specify recovery settings applied to the selected domain controller. For instance, a user can specify logon information, view or modify DNS settings, select backups or the like.

FIG. 8 illustrates a screen display of a second forest recovery report 800. The report 800 includes a similar layout as the new forest recovery report 700 with a command menu 830 and a project summary section 840. A "domain view" of the project settings section 850 further illustrates the recovery status of each listed domain controller.

FIG. 9 illustrates a screen display of a third forest recovery report 900. The report 900 includes a similar layout as the new forest recovery report 700 and the second forest recovery report 800 with a command menu 930, a project summary section 940 and a "plain view" of a project settings section 950.

The third forest recovery report 900 also includes a recovery progress section 960 that displays the progress or test process for a domain controller selected from the project settings section 950. In particular, the recovery progress section 960 lists different recovery actions, and their respective times, for the domain controller "dom1-dc9.dom1.forest1."

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may advantageously be configured to execute on one or more processors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

While certain embodiments of the inventions have been described, these embodiments have been presented by way of example only, and are not intended to limit the scope of the disclosure. For example, the description of Microsoft® Active Directory® service relates only to a description of some embodiments of the invention. Other embodiments of the system may be directed to non-Microsoft® directory services. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A computer-executable method for performing disaster recovery of directory data, the method comprising:
   identifying a plurality of domain controllers associated with multiple domains in a domain forest and communicatively coupled together through a network, each of the plurality of domain controllers storing a copy of a directory database, and each of the plurality of domain controllers having one or more replication partners;
   receiving a selection of at least one of the plurality of domain controllers to be recovered;
   executing in one or more computer processors on a remotely located console a restore process that creates a restored directory database for the selected domain controller from a backup copy of the directory database;
   while the selected domain controller remains online, automatically remotely disabling replication of the restored directory database on the selected domain controller with the remotely located console without disconnecting the selected domain controller from the network, wherein remotely disabling replication places the selected domain controller into a directory services restore mode that disables operation of the restored directory database, and wherein the remotely disabling replication further sets attributes associated with the directory services restore mode to prevent replication;
   after restoration of the restored directory database, placing the selected domain controller into normal mode; and
   re-enabling replication to the restored directory database on the selected domain controller to the replication partners.

2. The method of claim 1, wherein said remotely disabling replication comprises modifying an options attribute of a NTDS Settings object associated with the restored directory database on the selected domain controller.

3. The method of claim 2, wherein said modifying comprises accessing an extensible storage engine (ESE) application programming interface (API).

4. The method of claim 1, wherein said remotely disabling replication comprises at least one of: configuring a firewall of the selected domain controller, temporarily disabling a network adapter of the selected domain controller, and modifying an internet protocol security (IPsec) of the selected domain controller.

5. The method of claim 1, wherein said remotely disabling comprises:
receiving user input identifying the selected domain controller through a management console remotely located to the selected domain controller; and
transmitting one or more controls signals to a recovery agent executing on the selected domain controller to electronically disable replication.

6. The method of claim 1, wherein said restoring the backup copy and recovering the selected domain controller is performed concurrently.

7. The method of claim 1, wherein the first domain controller is in a first domain and additionally comprising recovering a second domain controller in a second domain by restoring a backup copy of a second directory database.

8. The method of claim 7, wherein the first domain and the second domain are part of an Active Directory forest.

9. The method of claim 1, wherein at least one of the remaining domain controllers comprises a DNS server associated with the selected domain controller.

10. The method of claim 9, additionally comprising, following said remotely disabling replication and prior to said re-enabling replication, determining if the DNS server associated with the selected domain controller has been restored.

11. The method of claim 10, additionally comprising preventing said re-enabling replication to the selected domain controller until the DNS server has been restored.

12. The method of claim 1, wherein said receiving the selection of at least one of the plurality of domain controllers to be recovered comprises receiving an instruction to recover multiple ones of the plurality of domain controllers.

13. The method of claim 1, further comprising reconciling the restored directory database.

14. The method of claim 1, further comprising reconciling the restored directory database with one or more of the plurality of domain controllers.

15. A system for recovering data following a directory service malfunction, the system comprising:
a processor;
a plurality of recovery agent modules, each recovery agent module being installed on a respective domain controller of a plurality of domain controllers communicatively coupled through multiple domains in a domain forest, each of the plurality of domain controllers having one or more replication partners;
a remotely located recovery manager module executing in one or more computer processors installed on an application server and in communication with each of the plurality of recovery agent modules, the remotely located recovery manager module being located remotely with respect to at least one of the plurality of domain controllers; and
a management console executing on a computing device in communication with the remotely located recovery manager module, wherein the management console is configured to receive a selection of at least one of the plurality of domain controllers to be recovered,
wherein the remotely located recovery manager module is configured to automatically issue one or more control signals to the recovery agent module of the selected domain controller to:
while the selected domain controller remains online, restore a backup copy of a directory database to the selected domain controller, and
while the selected domain controller remains online, remotely disable replication to the restored directory database on the selected domain controller without removing the selected domain controller from communication with the network wherein the control signals to remotely disable replication places the selected domain controller into a directory services restore mode that disables operation of the restored directory database, and wherein the remotely disabling replication further sets attributes associated with the directory services restore mode to prevent replication;
after restoration of the restored directory database, placing the selected domain controller into normal mode; and
re-enable replication of the restored directory database on the selected domain controller to the replication partners.

16. The system of claim 15, wherein the recovery agent module of the selected domain controller is configured to, in response to receiving the one or more control signals, set the options attribute of a NTDS Settings object associated with the restored directory database on the selected domain controller.

17. The system of claim 15, wherein the remotely located recovery manager is further configured to issue one or more second control signals to the recovery agent of a second domain controller of the plurality of domain controllers to restore a second backup copy of the directory database to the second domain controller substantially concurrently with the restoration of the backup copy of the directory database to the selected domain controller.

18. The system of claim 15, wherein the management console comprises a user interface.

19. The system of claim 15, wherein the management console is installed on the application server.

20. The system of claim 15, wherein the system is further configured to reconcile the restored directory database.

21. The system of claim 15, wherein the system is further configured to reconcile the restored directory database with one or more of the plurality of domain controllers.

22. A system for performing disaster recovery of directory data, the system comprising:
means for identifying a plurality of domain controllers associated with multiple domains in a domain forest and communicatively coupled through a network, each of the plurality of domain controllers storing a copy of a directory database, and each of the plurality of domain controllers having one or more replication partners;
means for receiving a selection of at least one of the plurality of domain controllers to be recovered;
means for executing, in one or more computer processors on a remotely located console, a restore process that creates a restored directory database for the selected domain controller from a backup copy of the directory database;
while the selected domain controller remains online, means for automatically remotely disabling replication of the restored directory database on the selected computing device without disconnecting the selected domain controller from the network, wherein the means for automatically remotely disabling replication places the selected domain controller into a directory services restore mode that disables operation of the restored directory database, and wherein the means for automatically remotely disabling replication further sets attributes associated with the directory services restore mode to prevent replication;

after restoration of the restored directory database, means for placing the selected domain controller into normal mode;

means for re-enabling replication to the restored directory database on the selected domain controller.

23. The system of claim 22, wherein said means for automatically remotely disabling is configured to modify an options attribute of a NTDS Settings object associated with the restored directory database on the selected domain controller.

24. The system of claim 22, wherein the system is further configured to reconcile the restored directory database.

25. The system of claim 22, wherein the system is further configured to reconcile the restored directory database with one or more of the plurality of domain controllers.

* * * * *